(12) United States Patent
Hagmann

(10) Patent No.: US 9,885,736 B2
(45) Date of Patent: Feb. 6, 2018

(54) ELECTRODE CONTROL METHODOLOGY FOR A SCANNING TUNNELING MICROSCOPE

(71) Applicant: Mark J. Hagmann, Salt Lake City, UT (US)

(72) Inventor: Mark J. Hagmann, Salt Lake City, UT (US)

( * ) Notice: Subject to any disclaimer, the term of this patent is extended or adjusted under 35 U.S.C. 154(b) by 38 days.

(21) Appl. No.: 15/174,939

(22) Filed: Jun. 6, 2016

(65) Prior Publication Data
US 2016/0356807 A1    Dec. 8, 2016

Related U.S. Application Data

(60) Provisional application No. 62/171,502, filed on Jun. 5, 2015.

(51) Int. Cl.
| | |
|---|---|
| *G01Q 60/10* | (2010.01) |
| *G01Q 10/00* | (2010.01) |
| *G01Q 10/06* | (2010.01) |

(52) U.S. Cl.
CPC ........... *G01Q 60/10* (2013.01); *G01Q 10/00* (2013.01); *G01Q 10/065* (2013.01)

(58) Field of Classification Search
CPC ...... G01Q 60/10; G01Q 10/065; G01Q 10/04; G01Q 10/02
See application file for complete search history.

(56) References Cited

U.S. PATENT DOCUMENTS

| | | | | |
|---|---|---|---|---|
| 4,871,938 A | * | 10/1989 | Elings | B82Y 35/00 310/317 |
| 9,329,201 B2 | * | 5/2016 | Randall | G01Q 20/00 |

OTHER PUBLICATIONS

D. Jeon and R.F. Willis, "Feedback system response in a scanning tunneling microscope," Rev. Sci. Instrum. Jun. 1991, pp. 1650-1651, vol. 62.

J.M. Soler, A.M. Baro, N. Garcia and H. Rohrer, "Interatomic forces in scanning tunneling microscopy: giant corrugations of the graphite surface," Phys. Rev. Lett. Jul. 1986, pp. 444-447, vol. 57.

H.J. Mamin, E. Ganz, D.M. Abraham, R.E. Thomson and J. Clarke, "Contamination-mediated deformation of graphite by the scanning tunneling microscope," Phys. Rev. B, Dec. 1986, pp. 9015-9018, vol. 34.

(Continued)

*Primary Examiner* — Wyatt Stoffa
(74) *Attorney, Agent, or Firm* — Dobbin IP Law; Geoffrey E. Dobbin

(57) ABSTRACT

A control methodology for scanning tunneling microscopy is disclosed. Instead of utilizing Integral-based control systems, the methodology utilizes a dual-control algorithm to direct relative advancement of a STM tip towards a sample. A piezo actuator and stepper motor advances an STM tip towards a sample at a given distance until measuring a current greater than or equal to a desired setpoint current. Readings of the contemporaneous step are analyzed to direct the system to change continue or change direction and also determine the size of each step. In simulations where Proportion and/or Integral control methodology was added to the algorithm the stability of the feedback control is decreased. The present methodology accounts for temperature variances in the environment and also appears to clean and protect the tip electrode, prolonging its useful life.

10 Claims, 1 Drawing Sheet

(56) References Cited

OTHER PUBLICATIONS

R.J. Colton, S.M. Baker, R.J. Driscoll, M.G. Youngquist and J.D. Baldeschweiler, "Imaging graphite in air by scanning tunneling microscopy: role of the tip," J. Vac. Sci. technol. Mar./Apr. 1988, pp. 349-353, A, vol. 6.
M.J. Hagmann, F.S. Stenger and A. Yarotski, "Linewidth of the harmonics in a microwave frequency comb generated by focusing a mode-locked ultrafast laser on a tunneling junction," J. Appl. Phys. 2013, 223107, vol. 114.
F. Flores and N. Garcia, "Voltage drop in experiments of scanning tunneling microscopy for Si," Phys. Rev. B, Aug. 1984, pp. 2289-229, vol. 30.
J.M. Blanco, C. Gonzalez, P. Jelinek, J. Ortega, F.Flores and R. Perez, "First-principles simulations of STM images: From tunneling to the contact regime," Phys. Rev. B, Aug. 2004, 085405, vol. 70.

\* cited by examiner

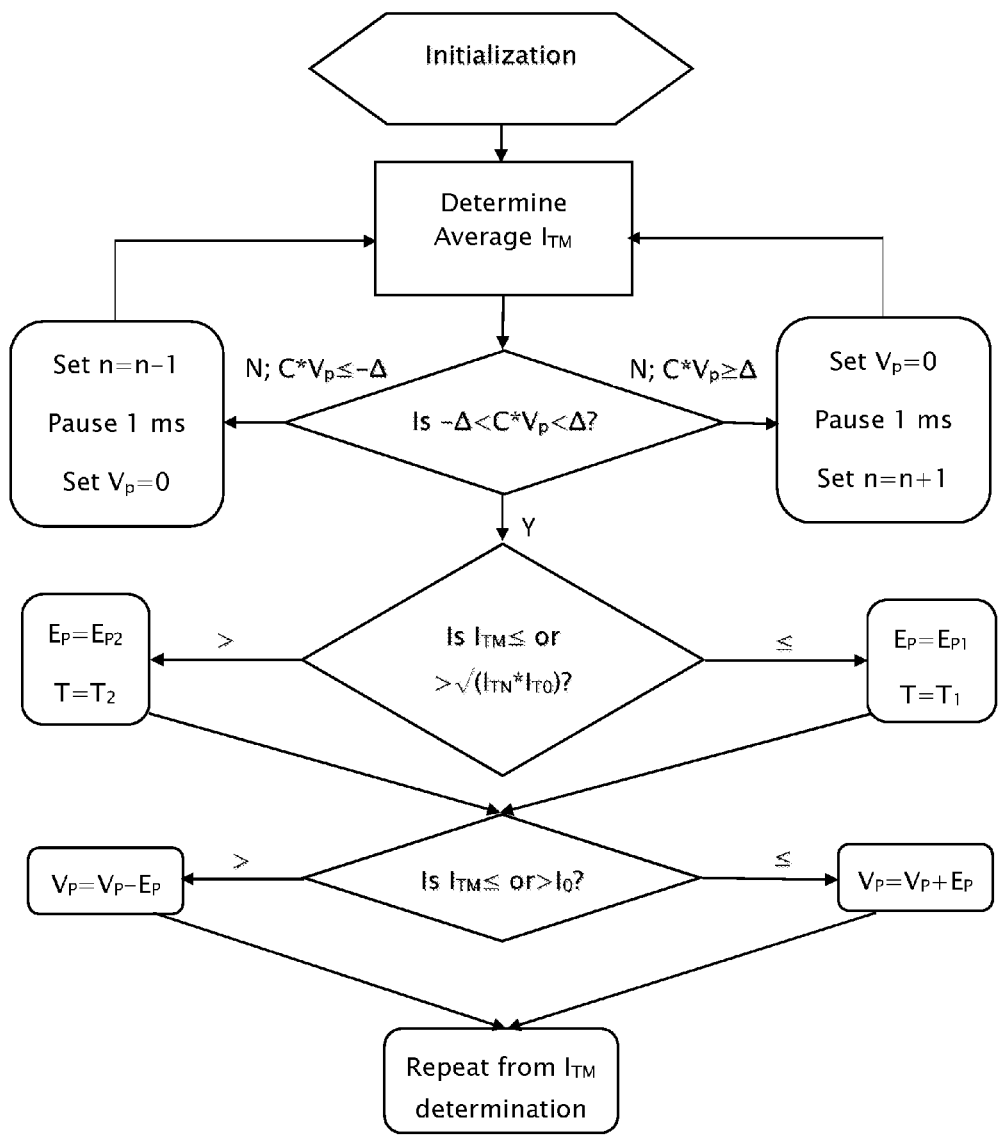

ELECTRODE CONTROL METHODOLOGY FOR A SCANNING TUNNELING MICROSCOPE

CROSS-REFERENCES TO RELATED APPLICATIONS

This Application claims priority as a non-provisional perfection of prior filed U.S. Application No. 62/171,502, filed Friday, Jun. 5, 2015, and incorporates the same by reference herein in its entirety.

FIELD OF THE INVENTION

The present invention relates to the field of scanning tunneling microscopy and more particularly relates to a method of achieving a precise and stable tunneling current between tip and sample electrodes of a scanning tunneling microscope and to avoid tip crash during the approach of the tip to the sample.

BACKGROUND OF THE INVENTION

Practitioners of the art of scanning tunneling microscopy generally use either Integral, Integral with Proportion, or Integral-Proportion-Derivative (collectively "PID") methodologies for feedback control as the tip electrode approaches the sample electrode to establish quantum tunneling and to maintain an approximately constant tunneling current after tunneling is established in a scanning tunneling microscope (STM) [D. Jeon and R. F. Willis, "Feedback system response in a scanning tunneling microscope," Rev. Sci. Instrum. Vol. 62, June 1991, pp. 1650-1651.]. Variants of PID feedback control, including one or more from the group Proportion, Integral, and Derivative, are appropriate in many applications once quantum tunneling has been established, such as in temperature control where a time-dependent error signal is continuously present. However, in scanning tunneling microscopy there is no measurable tunneling current until the tip is less than 1 nm from the sample, so without adequate control a moving tip may continue its motion and make contact in what is called "tip-crash" because the error signal maintains a value of 100% until the point where action must be taken immediately to prevent catastrophic failure. Tip crash ruins the tip and sample for nanoscale measurements. Many papers have been published showing atomic resolution with highly oriented pyrolytic graphite (HOPG) using different types of scanning tunneling microscopes that were operated in air. However, other measurements made under these conditions show that the giant corrugations seen in these images are artifacts caused by the pressure of the tip which is in direct contact with the sample [H. J. Mamin, E. Ganz, D. W. Abraham, R. E. Thomson and J. Clarke, "Contamination-mediated deformation of graphite by the scanning tunneling microscope," Phys. Rev. B, Vol. 34, December 1986, pp. 9015-9018.]. Furthermore, with tip-sample contact instead of quantum tunneling, there is also atomic resolution when the PID feedback control is disabled [R. J. Colton, S. M. Baker, R. J. Driscoll, M. G. Youngquist and J. D. Baldeschwieler, "Imaging graphite in air by scanning tunneling microscopy: role of the tip," J. Vac. Sci. technol. A, Vol. 6, March/April 1988, pp. 349-353.]. For quantitative research on laser-assisted tunneling, including the generation of a microwave frequency comb by optical rectification in a tunneling junction, it is essential to operate the STM in the tunneling mode because there is no microwave signal with tip-sample contact [M. J. Hagmann, F. S. Stenger, and A. Yarotski, "Linewidth of the harmonics in a microwave frequency comb generated by focusing a mode-locked ultrafast laser on a tunneling junction," J. Appl. Phys. Vol. 114, 2013, 223107]. While a rudimentary image can be obtained when the tip and sample are in contact, there would be no microwave frequency comb. Likewise, measurements of barrier height are totally meaningless when the tip and sample are in contact [J. M. Soler, A. M. Baro, N. Garcia and H. Rohrer, "Interatomic forces in scanning tunneling microscopy: giant corrugations of the graphite surface," Phys. Rev. Lett. Vol. 57, July 1986, pp. 444-447].

Typically, the derivative function is not used because it creates instability by accentuating the high-frequency noise in the current. Proportion methodology during approach is of little value because the RMS current (noise) obscures the difference between current when the tip is at one distance from the sample as opposed to that at a second distance. Furthermore, Integral methodology, which is frequently used by itself for feedback control in an STM, accumulates a significant error, called "integral windup," during tip approach. This integral windup is a result of the integration function being from a time T=0 s to the time the measurement is taken. This long time period creates data bias which interferes with the response that is essential to prevent tip-crash. Digital signal processors have been used to provide a faster response; but, this does not solve the problem of instability in the feedback control.

An analytic model of one embodiment of the present invention includes simulation of the effects of drift and noise on the current measured in a STM. The algorithm described herein was developed and the digital feedback control described using this algorithm is unusually stable. In simulations where Proportion and/or Integral methodologies are added to the algorithm, the stability of the feedback control is decreased.

The present invention represents a departure from the prior art in that the control methodology of the present invention allows for precise and stable relative positioning of tip and sample electrodes in an STM without the risk of tip-crash. The methodology also has the unexpected benefit of prolonging the usefulness of tip electrodes, including for continuous tunneling over multiple days. It is hypothesized that the stability of the algorithm not only prevents destruction caused by tip crash but also promotes continual cleaning of oxidized deposits off of said electrodes because the electric field is more nearly constant.

SUMMARY OF THE INVENTION

In view of the foregoing disadvantages inherent in the known types of STM electrode separation control this invention provides a new methodology that is more stable and reduces the incidence of tip crash while prolonging the useful life of tip electrodes.

To accomplish these objectives, the control method comprises a digital feedback model where tip and sample electrodes are moved together by incremental steps. The average current at each contemporaneous step is used to determine the size and direction of the next step.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

The FIGURE is a flowchart detailing steps of a methodology to control electrode approach and separation in an STM.

DETAILED DESCRIPTION OF THE PREFERRED EMBODIMENT

With reference now to the drawing, a preferred embodiment of the control methodology is herein described. It should be noted that the articles "a", "an", and "the", as used in this specification, include plural referents unless the content clearly dictates otherwise.

The tip electrode in the scanning tunneling microscope is moved relative to the sample in order to be close enough to create a measurable current by quantum tunneling and then feedback control is used to maintain a current to approximate a specified set-point for the current.

In order to obtain sub-nanometer resolution over a range which may be as large as 1 mm, it is generally necessary to combine two different devices to control the tip-sample distance D. A stepper motor for coarse movement, and a piezoelectric actuator (or "piezo") for fine movement, may be used for this purpose, which is generally done in scanning probe microscopy. Let $D = D_0 - n\Delta - CV_p$ where the stepper motor is moved incrementally in steps having length $\Delta$ meters, $V_p$ is the voltage applied to the piezo actuator, and C is the gain of the piezo actuator defined as the linear extension in meters per volt. Here $D_0$ is the tip-sample distance in meters for n=0 and Vp=0. If $-V_{max} \le V_p \le V_{max}$, then with a fixed setting of n on the stepper motor, $D_0 - n\Delta - CV_{max} < D < D_0 - n\Delta + CV_{max}$. It is necessary for $V_{max} > \Delta/2C$ so that the total peak-to-peak displacement caused by the piezoelectric actuator exceeds the step-size for incremental motion by the stepper motor in order to continuously cover all values of the distance D with this system. For example, with $V_{max} > \Delta/C$ so that the span covered by the piezo actuator exceeds $2\Delta$, a value of D in a span of $2\Delta$ may be centered within the span of the piezo actuator by incrementing the stepper motor by one step of $\Delta$. This synergistic means for combining the stepper motor with a piezoelectric actuator is efficiently and effectively implemented in the algorithm. It is of course to be understood that any other means known or later discovered to control the distance between the tip and sample may also be incorporated into this algorithm. The key functionality is that there is a system for coarse movement and a separate, overlying system for finer movement.

In this algorithm, as well as in applications, it is necessary to use expressions for the tunneling current that correct for the effects of the spreading resistance in the sample [F. Flores and N. Garcia, "Voltage drop in experiments of scanning tunneling microscopy for Si," Phys. Rev. B, Vol. 30, August 1984, pp. 2289-2291] and make thin-barrier corrections for small tip-sample distances [J. M. Blanco, C. Gonzalez, P. Jelinek, J. Ortega, F. Flores and R. Perez, "First-principles simulations of STM images: From tunneling to the contact regime," Phys. Rev. B, Vol. 70, August 2004, 085405] in order to properly specify $E_{p1}$. The basic control algorithm consists of 4 distinct steps, including establishing initial parameters, which may be repeated on various occasions to accomplish the desired separation distance and desired tunneling current between the tip and sample electrodes of an STM. The following variables are defined in the method:

C is the ratio of the length change for the piezo actuator to the voltage, in meters per volt.

D is the distance between the tip and the sample in meters.

$D_0$ is the tip-sample distance in meters below which $I_T$ is greater than $I_{T0}$.

$E_P$ is the voltage step by which $V_p$ is incremented, either $E_{P1}$ or $E_{P2}$.

$E_{P1}$ is the voltage step by which $V_p$ is incremented in the initial approach of the tip, before there is a measurable current.

$E_{P2}$ is the voltage step by which $V_p$ is incremented when $I_T$ is significantly greater than $I_{TN}$.

$I_T$ is the tunneling current in amperes.

$I_{TM}$ is the average value of the current $I_T$ in amperes obtained by averaging $I_T$ over time T.

$I_{TN}$ is the measured rms noise in the current in amperes.

$I_{T0}$ is the set-point current specified for the tunneling current in amperes.

n is the number of steps by the stepper motor.

T is the delay time in seconds for each cycle of the algorithm.

$T_1$ is the delay time during the initial approach of the tip, before there is a measurable current.

$T_2$ is the delay time when $I_T$ is significantly greater than $I_{TN}$.

$V_b$ is the bias voltage applied between the tip and the sample.

$V_{max}$ is the maximum magnitude for voltage applied to the piezo actuator.

Vp is the voltage applied to the piezo actuator.

$V_{RES}$ is the DAC resolution for Vp in volts.

$\Delta$ is the step size for the stepper motor in meters.

The steps in the exemplary algorithm are as follows:

1. Initial determinations and settings must be made.

1.1. Enter the parameters C, $I_{TN}$, $I_{T0}$, $V_b$, $V_{max}$, $V_{RES}$, $\Delta$, as well as the properties of the tip and sample that are required for simulations.

1.2. Use simulations to approximate the parameter $D_0$.

1.3. Calculate $E_{P1}$ and $E_{P2}$, the steps by which the $V_p$ is incremented, where $E_{P1}$ is used in the initial approach and $E_{P2}$ is used when $I_T$ is significantly greater than $I_{TN}$. $E_{P2}$ being at least twice $V_{RES}$ and the $E_{p1}$ being less than ¼ of the voltage that would cause tip crash once tunneling has been established. For example, $E_{P2}=4*V_{RES}$ and $E_{P1}=D_0/(6*C)$.

1.4. Initialize n=0, $V_p=0$, and $E_P=E_{P1}$.

1.5. Calculate $T_1$ and $T_2$, the delay times for pauses in each cycle of the algorithm, where $T_1$ is used in the initial approach to provide greater accuracy when the tunneling current is small and thus difficult to measure (usually between 1 and 100 ms inclusively to provide greater signal averaging to detect a weaker current), and $T_2$ is used when $I_T$ is significantly greater than $I_{TN}$. For example, $T_2$ may be as short as 100 μs—varying with the reciprocal of the resonant frequency of a piezoelectric actuator and the filtering used to smooth the change in $V_p$. However, $T_1$ may be 100 times greater, such as 10 ms, to reduce the noise by a factor of 10 by increasing the time for signal averaging.

1.6. Initialize T to $T_1$.

2. Determine $I_{TM}$.

2.1. Set $I_{TM}$ to zero and start measuring $I_T$.

2.2. Measure for time T.

2.3. Average measured $I_T$ over time T to obtain $I_{TM}$.

3. Increment the stepper motor so that $V_p$ satisfies $-V_{max}<V_p<V_{max}$.

IF (($C*V_p>-\Delta$) AND ($C*V_p<\Delta$) GOTO step 4.

IF ($C*V_p>\Delta$) THEN set $V_p=0$, PAUSE 1 ms, and set n=n+1 ENDIF

IF ($C*V_p<-\Delta$) THEN set n=n−1, PAUSE 1 ms, and set $V_p=0$ ENDIF

WRITE n.

WRITE $V_p$.

GOTO step 2.

4. Update $V_p$ for the piezo and T for the delay based on $I_{TM}$, the average value of $I_T$.

4.1. Change $E_P$ between $E_{P1}$ and $E_{P2}$ and T between $T_1$ and $T_2$ as necessary.

IF ($I_{TM}<SQRT(I_{T0}*I_{TN})$) set $E_P=E_{P1}$ and $T=T_1$ ENDIF

IF ($I_{TM}\geq SQRT(I_{T0}*I_{TN})$) set $E_P=E_{P1}$ and $T=T_2$ ENDIF 4.2. Update $V_p$, the voltage on the piezo actuator.

IF ($I_{TM}<I_{T0}$) set $V_p=V_p+E_P$ ENDIF

IF ($I_{TM}\geq I_{T0}$) set $V_p=V_p-E_P$ ENDIF

WRITE T

WRITE $V_p$.

GOTO step 2.

There is an optimum value for the pause T and the voltage step $E_P$ for the piezo actuator during each cycle of the algorithm. During the initial approach before the tunneling current is measurable, set T to the larger value of $T_1$ for increased signal averaging to provide greater accuracy for earlier response to the tunneling current. However, when $I_T$ is significantly greater than the noise $I_{TN}$, set T to the smaller value of $T_2$ to provide faster response to prevent tip crash. Similarly, during the initial approach before the tunneling current is measurable, set $E_p$, the voltage step for the piezo actuator, to the larger value of $E_{p1}$ to reduce the time that is required to achieve tunneling. However, when $I_T$ is significantly greater than the noise $I_{TN}$, set $E_p$ to the smaller value of $E_{p2}$ to provide finer resolution in the motion to prevent tip crash.

In initial testing of an earlier version of this algorithm (as described in the parent provisional application), a test fixture similar to that shown in a previous design patent (U.S. Pat. No. D695,801) was used in which coarse positioning is done using a 3-axis stepper motor system (Thor Labs Nanomax) having a step size of 60 nm and total travel of 4 mm on each axis. The piezo actuator (Boston Piezo-Optics PZT-5H radial tube with 0.024 inch wall, 0.394 inch OD, 0.984 inch length) has a travel of 13 nm/V, and has a voltage rating of ±288 VDC. However, in order to obtain unusually high resolution, the applied bias was limited to ±10V with the D/A converter set for 16-bit resolution in this interval to provide a range of 265 nm with a voltage step size of 300 μV corresponding to a nominal displacement of 0.004 nm. The test fixture was mounted on a negative-stiffness vibration isolation platform and placed in an acoustical isolation box. A low-noise current preamplifier (Stanford Research Systems SR570) was used to measure the tunneling current, and this system was interfaced to a desktop computer using LabVIEW. This system has relatively slow operation, with approximately 30 steps of the piezo actuator per second, but the speed will be increased later by using a FPGA and optimal shaping of the waveform of the piezo voltage to minimize effects of the piezo resonance. Thus far, all measurements with this system have been made in air.

The STM system is unusually stable and robust. Typically, the standard deviation of the tunneling current is less than 10% of the mean, and the instrument is stable even when using tunneling currents of 1 μA even though the tip is quite close to the sample. The time to establish tunneling is typically less than 10% of that in the commercial systems. Of further note, tungsten tips prepared by electrochemical etching followed by vacuum annealing were used. Typically, with commercial scanning tunneling microscopes, many have found it necessary to anneal each tungsten tip immediately before it is used and the tip lifespan is typically no more than one hour. However, tips used in an STM according to the practices of this methodology have repeatedly been used during a two-week period, and even continuously for periods of over 48 hours, with no further treatment. It is hypothesized that this improvement may be caused by the high stability of the tip approach, which makes tip crash less likely, as well as the more nearly constant characteristics of the electric field. A more nearly constant field may enable cleaning of contaminants from the surface of the tip electrode. Likewise, the lack of fluctuations in the electric field may reduce the stress on the tip electrode by reducing the peak values of the electric field.

Although the present invention has been described with reference to preferred embodiments, numerous modifications and variations can be made and still the result will come within the scope of the invention. As an example, additional step sizes may be incorporated, as may multipliers and dividers to step sizes to provide more dynamic range of motion. Determinations on what to do in the algorithm when a determined value equals a target value are also arbitrary and may be switched. The threshold value to the measured average tunneling current is set as the geometric mean of the targeted tunneling current and the noise current. Other functions, such as a multiple of the noise level may be utilized. No limitation with respect to the specific embodiments disclosed herein is intended or should be inferred.

What is claimed is:

1. A control method for using a scanning tunneling microscope in an operation, the method comprising:
    a. providing a sample electrode and a tip electrode, at least one of which is positioned on a means for coarse movement and at least one of which is positioned on a means for fine movement;
    b. specifying a set point for a current to be used after tunneling occurs and also an initial value for average noise in the current before tunneling occurs;
    c. specifying:
        i. two different incremental voltages, one larger and one smaller, for incrementing the means for fine movement;

ii. two different lengths of time, one larger and one smaller, to be used in averaging measured tunneling current; and iii. a current threshold between the average noise in the current before tunneling and the set point for the current after tunneling occurs;

d. adjusting the means for fine movement and the means for coarse movement so that there is a measurable tunneling current;

e. measuring the tunneling current and obtaining an average tunneling current over a designated time period chosen to be one of the two different lengths of time and determining if the average tunneling current is above or below the threshold;

f. if the average tunneling current is below the threshold, actuating the means for coarse movement in a manner to bring the average tunneling current closer to the set point tunneling current value and use the larger time period for a next designated time period;

g. if the average tunneling current is above the threshold, actuating the means for fine movement in a manner to bring the average tunneling current closer to the set point tunneling current value and set a smaller time period for a next designated time period;

h. repeating steps e through g;

wherein the larger incremental voltage and larger length of time are used for coarse approach and the smaller incremental voltage and smaller length of time are used for fine approach, thus more signal averaging is used for sensitivity when the current is small and higher resolution in positioning is possible once tunneling has been established.

2. The control method of claim 1, the given threshold being a current value based upon the geometric mean of the set point tunneling current and the average noise.

3. The control method of claim 2, the smaller period of time being longer than the reciprocal of a resonant frequency of the means for fine movement and the longer period of time being between 1 and 100 ms inclusively.

4. The control method of claim 3, the smaller incremental voltage being at least twice the resolution in a digital-to-analog converter driving the means for fine movement and the larger incremental voltage being less than ¼ of the voltage that would cause tip crash once tunneling has been established.

5. The control method of claim 4, further comprising a step of compensating for spreading resistance and thin-barrier corrections, based on simulations in order to specify the larger incremental voltage.

6. The control method of claim 1, the smaller period of time being longer than the reciprocal of a resonant frequency of the means for fine movement and the longer period of time being between 1 and 100 ms inclusively.

7. The control method of claim 6, the smaller incremental voltage being at least twice the resolution in a digital-to-analog converter driving the means for fine movement and the larger incremental voltage being less than ¼ of the voltage that would cause tip crash once tunneling has been established.

8. The control method of claim 7, further comprising a step of compensating for spreading resistance and thin-barrier corrections, based on simulations in order to specify the larger incremental voltage.

9. The control method of claim 1, the smaller incremental voltage being at least twice the resolution in a digital-to-analog converter driving the means for fine movement and the larger incremental voltage being less than ¼ of the voltage that would cause tip crash once tunneling has been established.

10. The control method of claim 9, further comprising a step of compensating for spreading resistance and thin-barrier corrections, based on simulations in order to specify the larger incremental voltage.

* * * * *